US010290013B2

(12) United States Patent
Smets et al.

(10) Patent No.: US 10,290,013 B2
(45) Date of Patent: May 14, 2019

(54) METHODS AND APPARATUS FOR STANDARD APPROACH TO COUPON SELECTION

(75) Inventors: Patrik Smets, Nijlen (BE); David A. Roberts, Warrington (GB); Jonathan Main, Hampshire (GB)

(73) Assignee: Mastercard International Incorporated, Purchase, NY (US)

( * ) Notice: Subject to any disclaimer, the term of this patent is extended or adjusted under 35 U.S.C. 154(b) by 1285 days.

(21) Appl. No.: 13/451,770

(22) Filed: Apr. 20, 2012

(65) Prior Publication Data

US 2013/0282459 A1 Oct. 24, 2013

(51) Int. Cl.
*G06Q 30/00* (2012.01)
*G06Q 30/02* (2012.01)
*G06Q 20/04* (2012.01)
*G06Q 20/32* (2012.01)
*G06Q 20/38* (2012.01)

(52) U.S. Cl.
CPC ....... *G06Q 30/0207* (2013.01); *G06Q 20/045* (2013.01); *G06Q 20/322* (2013.01); *G06Q 20/387* (2013.01); *G06Q 30/0238* (2013.01)

(58) Field of Classification Search
CPC .. G06Q 20/045; G06Q 20/322; G06Q 20/387; G06Q 30/0207; G06Q 30/0238
USPC ...................................................... 705/14.23
See application file for complete search history.

(56) References Cited

U.S. PATENT DOCUMENTS

| | | | |
|---|---|---|---|
| 7,930,249 B2* | 4/2011 | Roberts | 705/41 |
| 8,196,131 B1* | 6/2012 | von Behren et al. | 717/168 |
| 8,751,314 B2* | 6/2014 | Fisher | 705/16 |
| 8,799,087 B2* | 8/2014 | Martin et al. | 705/17 |
| 2008/0167961 A1* | 7/2008 | Wentker et al. | 705/14 |
| 2008/0172317 A1* | 7/2008 | Deibert | G06Q 20/10 705/35 |
| 2008/0306849 A1* | 12/2008 | Johnson et al. | 705/35 |
| 2011/0244769 A1* | 10/2011 | David et al. | 451/539 |
| 2012/0123847 A1* | 5/2012 | Wane et al. | 705/14.26 |
| 2012/0265685 A1* | 10/2012 | Brudnicki et al. | 705/44 |

(Continued)

OTHER PUBLICATIONS

Alcatel Lucent (NFC White Paper Alcatel-Lucent Mobile Wallet Service, mCommerce Product Group, Dec. 2011).*

(Continued)

*Primary Examiner* — Folashade Anderson
(74) *Attorney, Agent, or Firm* — Buckley, Maschoff & Talwalkar LLC

(57) ABSTRACT

Presented are apparatus and methods for utilizing coupons and the like in the context of a contactless payment process. A processor of a payment-enabled mobile device stores a Proximity Coupon System Environment (PCSE). The PCSE includes coupon applications that provide for an alternative form of payment and/or that influence a final transaction amount for a payment transaction. The method includes storing in a File Control Information (FCI) file of the PCSE a list of the coupon applications, and storing in a FCI file of a Proximity Payment System Environment (PPSE) an indication of the existence of the PCSE. When a payment transaction request is received from a proximity reader, the payment-enabled mobile device transmits the indication of the existence of the PCSE and the list of coupon applications that are to be considered before determining the final transaction amount.

5 Claims, 5 Drawing Sheets

(56) References Cited

U.S. PATENT DOCUMENTS

2014/0263618 A1* 9/2014 McCarthy ............. G06Q 40/02
235/379
2015/0088736 A1* 3/2015 Bu ...................... G06O 20/367
705/41

OTHER PUBLICATIONS

"NFC White Paper, Alcatel-Lucent Mobile Wallet Service" (Dec. 2011) available at http://www.tmcnet.com/tmc/whitepapers/documents/whitepapers/2013/6703-nfc-white-paper-alcatel-lucent-mobile-wallet-service.pdf.*

"MasterCard PayPass, Mag Stripe, Acquirer Implementation Requirements" (2006) available at https://www.paypass.com/pdf/public_documents/PayPass-Mag%20Stripe%20Acquirer%20Implemenation%20Requirements.pdf.*

Fonte, E. F. "Overview of mobile payments in the United States". Banking & Financial Services Policy Report. (Year: 2013).*

* cited by examiner

US 10,290,013 B2

METHODS AND APPARATUS FOR STANDARD APPROACH TO COUPON SELECTION

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal.

In pursuit of greater convenience and more rapid transactions at POS terminals, payment cards have been developed that allow the account number to be automatically read from the card by radio frequency communication between the payment card and a "proximity reader", which device may be incorporated with the POS terminal. Such cards are often referred to as "proximity payment cards" or "contactless payment cards" or "smart cards", and typically include a radio frequency identification (RFID) integrated circuit (IC), often referred to as a "chip" embedded in the card body. A suitable antenna is also embedded in the card body and is connected to the RFID chip to allow the chip to receive and to transmit data by RF communication via the antenna. In typical arrangements, the RFID chip is powered from an interrogation signal that is transmitted by the proximity reader and received by the card antenna. MasterCard International Incorporated, the assignee hereof, has established a widely-used standard, known as "PayPass®", for interoperability of contactless payment cards and proximity readers. It has also been proposed to use wireless exchanges of information via NFC (Near Field Communication) for payment applications.

The capabilities of a contactless payment card have also been incorporated into electronic portable devices or mobile devices, thereby turning such mobile devices into contactless payment devices. For example, key fobs and mobile telephones have been provided with integrated circuitry that has the same functionality as the RFID IC of a contactless payment card. The mobile device and/or contactless payment device typically also includes a loop antenna that is coupled to the payment-related IC for use in sending and/or receiving messages in connection with a transaction that involves contactless payment.

This disclosure presents apparatus and methods for providing a standard approach to couponing in the context of a contactless purchase transaction. In particular, novel features and ways of interacting with a contactless payment device, such as a payment-enabled mobile telephone, to facilitate purchase transactions that include the use of coupons, loyalty points, travel pass and the like, are described. Such operation enhances the speed and convenience of transactions that involve the use of coupons, loyalty points, travel pass, and the like with contactless payment-enabled mobile telephones or other payment-enabled portable devices.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

DETAILED DESCRIPTION

In general, and for the purpose of introducing concepts of novel embodiments described herein, presented are apparatus and methods for utilizing coupons and the like in the context of a contactless payment process. In particular, a cardholder (for example, a credit card account holder or debit card account holder) may utilize a contactless payment device (for example, a payment-enabled mobile device such as a mobile telephone) that includes a virtual wallet application, a payment application and one or more couponing applications, operable to purchase goods or services. In an implementation, separate directories are created on the proximity payment device for payment applications and for coupon applications. In the present disclosure, one directory is referred to as the Proximity Payment System Environment ("PPSE") and the other directory is referred to as the Proximity Coupon System Environment ("PCSE"). In some implementations according to the disclosed methods, the PCSE is to be consulted prior to initiation of the payment application. Accordingly, the method includes triggering a coupon selection process and selecting the coupon application prior to performing the payment transaction. In some embodiments, additional information is included in the File Control Information ("FCI") file of the Proximity Payment System Environment ("PPSE") that indicates whether the PCSE is present or not present.

In the present disclosure, the term "coupon transaction" includes, but is not limited to, transactions that involve the use of coupons, loyalty points, travel pass, and the like which may affect the amount of payment due for a transaction. According to some embodiments disclosed herein, coupon transactions are performed before the payment transaction as they provide an alternative means of payment and/or they may influence the final transaction amount of the payment transaction. Thus, the process includes determining whether the PCSE should be consulted and whether the user experience should consists of a single tap, a dual tap or potentially a triple tap when combining a couponing application with a payment application. The process also distinguishes between an initial transaction amount (obtained prior to the start of the transaction) and a final transaction amount (which is obtained prior to the payment part of the transaction). In addition, coupon transactions may be cumulative, for example, by combining the values of coupons or loyalty points, for example, from different applications. Thus, in some embodiments the process may involve determining that the PCSE should be consulted and requiring multiple taps of the proximity payment device on a landing zone of a proximity reader device in order to proceed. The apparatus and processes described herein facilitate and enhance the use of coupons and the like when utilizing a proximity payment device, such as payment-enabled mobile telephones and/or other payment-enabled portable devices.

Figure 1:
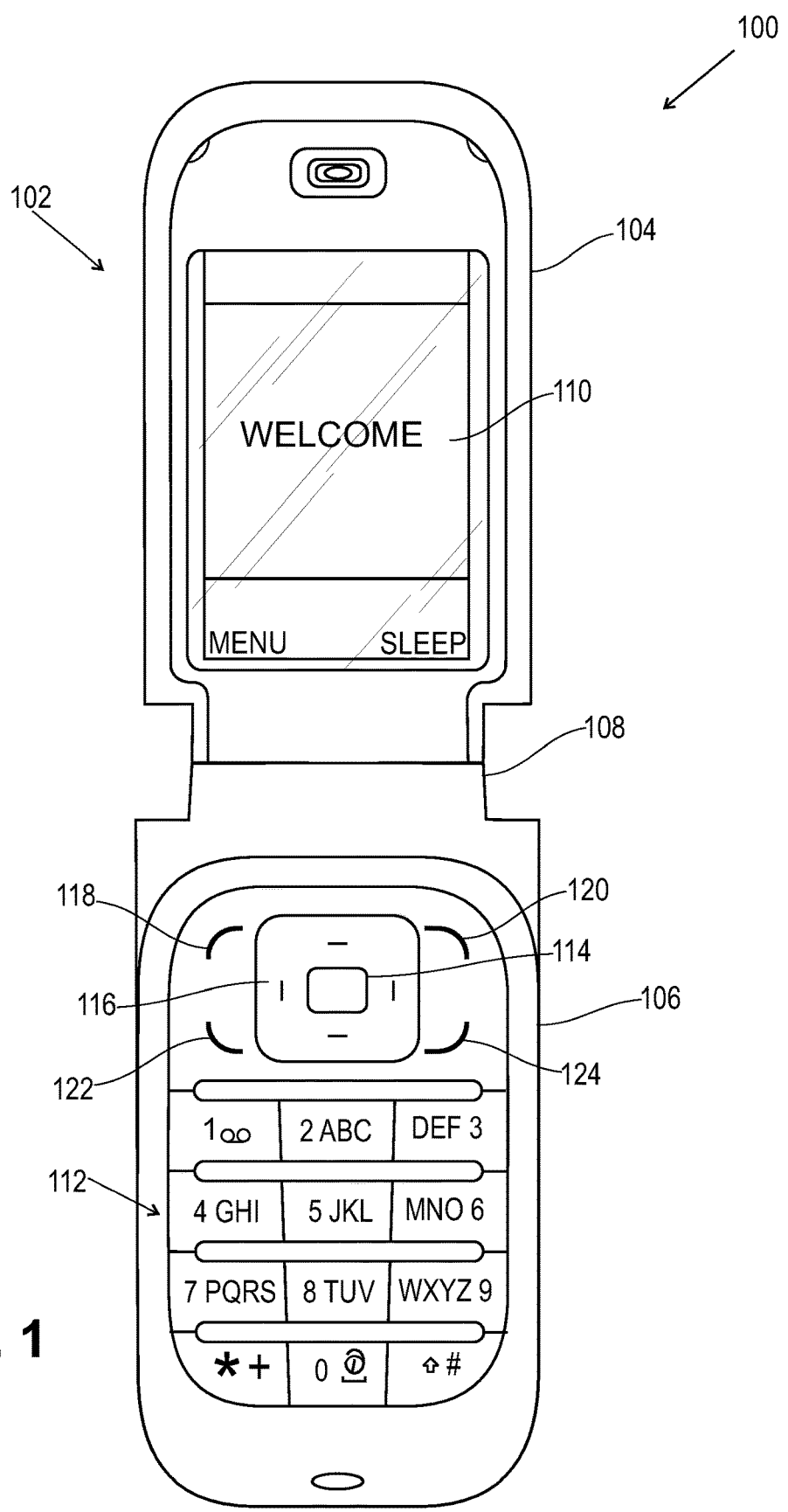
FIG. 1 is a plan view of an example of a payment-enabled mobile telephone operable for making telephone calls and configured for contactless payment transactions, of a type that contains features and processes in accordance with the present invention.

FIG. 1 is a plan view of a mobile telephone 100 (in a flipped open condition) in which the present methods may be applied. In particular, the mobile phone 100 includes a conventional hinged housing 102, including a display housing portion 104 and a control housing portion 106. The display housing portion 104 and the control housing portion 106 are hingedly joined together at a hinge 108, and thus can pivot away from each other about the hinge to an open position (as shown), and pivot towards each other to a closed position (not shown). A conventional display component 110 is shown mounted in the display housing portion 104, and in some embodiments the display component 110 may be a touch screen. Various control buttons and switches are mounted on the control housing portion 106. These buttons and switches include a conventional telephone numeric keypad 112, and can also include a "select" button 114 nested within a four-way rocker/scroll switch 116. In the embodiment shown, further buttons and switches include soft-keys 118 and 120, a start call key 122 and an end call key 124.

Figure 2:
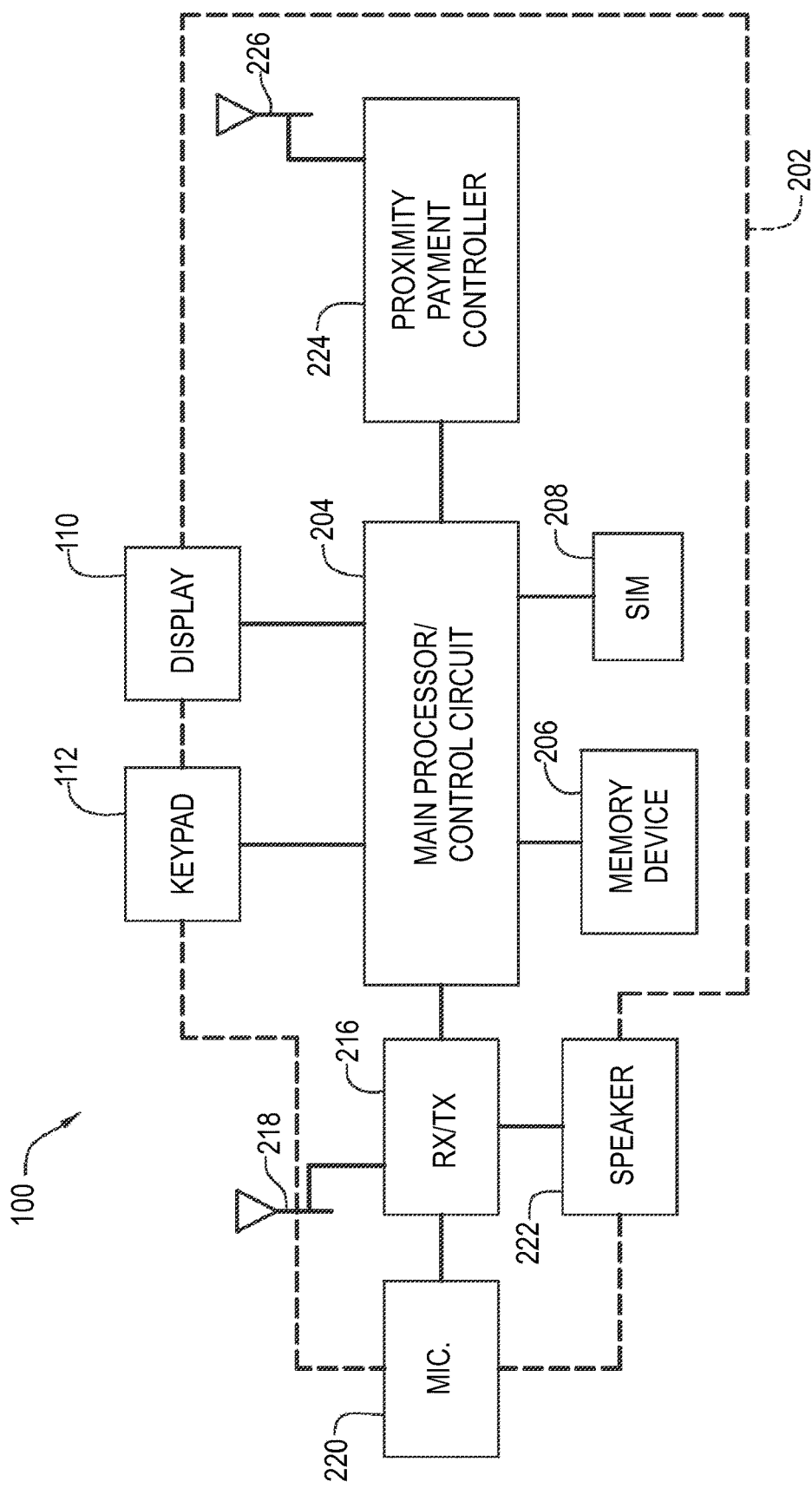
FIG. 2 is a schematic block diagram representation of the mobile telephone of FIG. 1.

FIG. 2 is a schematic block diagram representation of the mobile telephone 100. The mobile telephone 100 is operable both for making telephone calls and for contactless payment transactions. Thus, it will be referred to herein as a payment-enabled mobile telephone and/or a contactless payment device. It should also be understood that the novel processes described herein could also be applied to other payment-enabled portable devices, such as personal digital assistants (PDAs), portable music players (such as an iPod™), key fobs, tablet computers and the like electronic devices.

Referring again to FIG. 2, the contactless payment device 100 may include a conventional housing (indicated by dashed line 202) that contains and/or supports the other components of the contactless payment device 100. The housing 202 may be shaped and sized to be held in a user's hand, and may for example fit in the palm of the user's hand. Conventional control circuitry 204 can be used to control the over-all operation of the mobile telephone 100. The control circuitry may be, for example, a main processor or microprocessor manufactured by the Intel® Corporation that is configured for cell phone operation. Other components of the mobile telephone/contactless payment device 100, which are in communication with and/or controlled by the control circuitry 204, include: (a) one or more memory devices 206 (e.g., program and working memory, etc.); (b) a conventional Subscriber Identification Module (SIM) card 208; (c) the above-mentioned keypad 112 (see FIG. 1) for receiving user input; and (d) the above-mentioned display component 110 for displaying output information to the user. As mentioned earlier, in some embodiments the display component 110 is a touch screen capable of accepting user input as well as for displaying information to the user, in which case the keypad 112 (including some or all of the buttons, switches and keys) may be omitted.

The mobile telephone/contactless payment device 100 also includes conventional receive/transmit circuitry 216 that is in communication with and/or controlled by the control circuitry 204. The receive/transmit circuitry 216 is coupled to an antenna 218 and provides the communication channel(s) by which the mobile telephone 100 communicates via a mobile network (not shown). Also included are a conventional microphone 220 coupled to the receive/transmit circuitry 216, wherein the microphone 220 is for receiving voice input from the user, and a loudspeaker 222 to provide sound output to the user, which is coupled to the receive/transmit circuitry 216.

The receive/transmit circuitry 216 may operate in conventional fashion to transmit, via the antenna 218, voice signals generated by the microphone 220, and to reproduce, via the loudspeaker 222, voice signals that are received via the antenna 218. The receive/transmit circuitry 216 may also handle the transmission and the reception of text messages and/or other data communications via the antenna 218.

The mobile telephone 100 also includes a proximity payment controller 224 in the form of an integrated circuit (IC) or chipset of the kind embedded in contactless payment devices, such as contactless proximity cards, sometimes also referred to as "smart cards" or "chip cards." The IC or chipset 224 may also be referred to as a "payment circuit". The payment circuit 224 may be configured to store one or more card account number(s) that identify the card account(s) that have been issued to the individual who owns the mobile telephone 100. In addition, the mobile telephone 100 may include a loop antenna 226 that is coupled to the payment circuit 224. The payment circuit 224 may be configured to interact with an RFID proximity reader (or a NFC proximity reader) that may be associated with a Point-of-Sale (POS) terminal (such as a cash register in a retail store) to provide a card account number (stored in the payment circuit 224) for a purchase transaction at the POS terminal. For example, the payment circuit 224 may be designed and/or programmed to operate in accordance with the above-mentioned PayPass® standard.

In some embodiments, the proximity payment circuit 224 may be at least partially integrated with the main processor control circuit 204. One or more payment application program(s) may be configured to run in the payment circuit 224 and/or the control circuit 204, and can be stored in the mobile phone 100. Functionality as described herein may be provided from program instructions stored in the proximity payment circuit 224 and/or in the memory device 206 and/or in another memory device or storage component (not shown) which may be associated with the control circuit 204 and/or with the proximity payment circuit 224. The stored program instructions may control a processing element which may be the control circuit 204 or which may constitute at least part of the proximity payment circuit 224. In accordance with conventional teachings, the mobile phone 100 may include a "secure element" (not separately shown) which may constitute a portion of the proximity payment circuit 224 and/or the control circuit 204 and/or of the SIM card 208. The secure element may store the payment application program and card account number(s) and/or other sensitive information related to the payment capabilities and/or other transaction capabilities of the proximity payment device 100.

Figure 3:
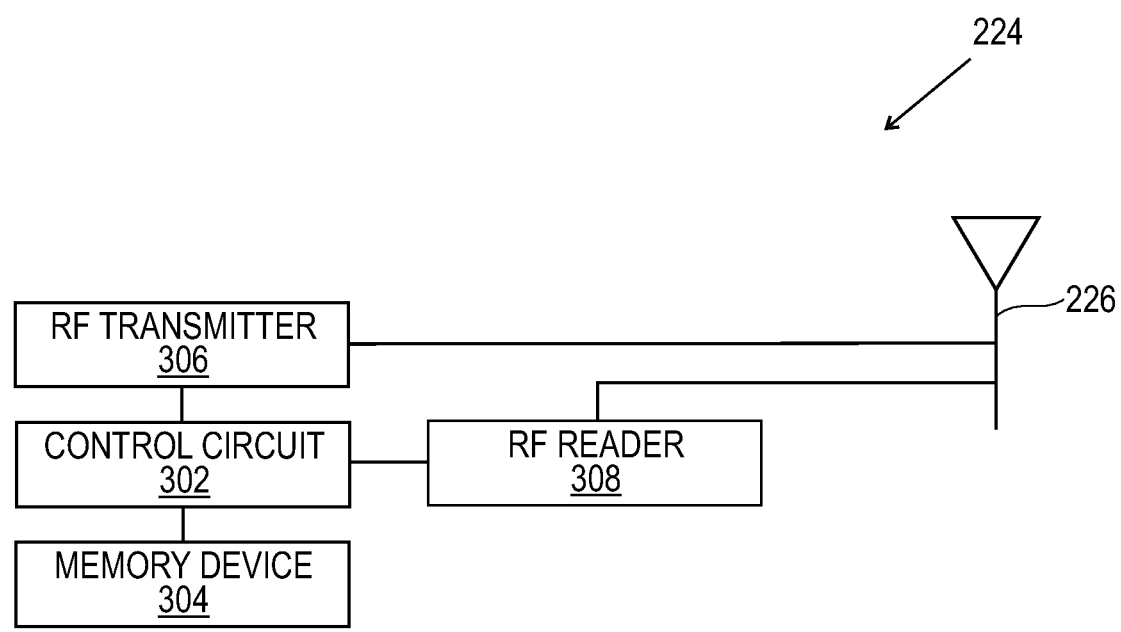
FIG. 3 is a block diagram illustrating details of an embodiment of a proximity payment control circuit that may be included in the mobile telephone of FIG. 2.

FIG. 3 is a schematic block diagram illustrating details of an embodiment of a proximity payment circuit 224 suitable for use in a mobile device such as the mobile telephone 100. In particular, the payment circuit 224 includes a control circuit 302 which may be a microprocessor or microcontroller (or a circuit with similar functionality). In some implementations, the proximity payment circuit 224 is provided as a separate integrated circuit or "chip" and is thus separate from the main processor 204 (FIG. 2) of the mobile telephone. However, in other implementations, the control circuit 302 may be integrated with the main processor. In either case, the control circuit 302 is configured for communication with the main processor 204 (as shown in FIG. 2).

Referring again to FIG. 3, the proximity payment circuit 224 includes a memory device 304 in communication with the control circuit 302. The memory device 304 may be constituted by one or more different devices, and may overlap at least partially with the memory device 206 shown in FIG. 2. (Alternatively, the memory 304 may be separate from the memory 206 shown in FIG. 2.) The memory or storage device 304 may store one or more applications constituting program instructions that control the operation of the control circuit 302 (and/or main processor 204) and that cause the mobile telephone 100 to operate as a proximity payment device including couponing in the manner described herein.

As shown in FIG. 3, the payment circuit 224 also includes an RF transmitter 306 coupled to the antenna 226 and to the control circuit 302. The RF transmitter 306 may be under the control of the control circuit 302 and may operate in a conventional manner. That is, the RF transmitter 306 may respond to interrogation signals (received from external RF readers that are not shown) by transmitting a payment card account number or other identifying operation, and may also transmit other data. The RF transmitter 306 may operate in accordance with one or more conventional Radio Frequency Identification (RFID) standards, such as either of the above-mentioned PayPass® and NFC standards. In addition, and in accordance with aspects described herein, the payment circuit 224 may include an RF reader 308 that is coupled to the antenna 226 and to the control circuit 302. The RF reader 308 may be under the control of the control circuit 302 and may operate in accordance with conventional principles. For example, the RF reader may transmit an interrogation signal at regular intervals via the antenna 226 and after each interrogation signal may listen for a possible response signal and/or message from a nearby RFID tag (not shown in FIG. 3). For example, the RF reader transmits an interrogation signal while in a retail store such as "Best Buy" and listens for a response signal from an RFID tag that may be located near the cash registers. The RFID tag may transmit a signal that includes data identifying the merchant store as a "Best Buy" retail store, which enables the mobile telephone 100 to recognize the store. The RF reader 308 may also operate in accordance with a conventional standard for short distance RF communication, such as the NFC standard.

It should be understood that, in its hardware aspects, the mobile telephone 100 may be entirely conventional, but the components described above may be programmed, in accordance with aspects described herein, to provide novel coupon and payment transaction functionality as described below. It should also be understood that the functionality of the devices is driven by the chip or circuitry inside and is independent of the form factor in which the chip resides, and thus other types of mobile devices and/or smart cards may be programmed in accordance with aspects described herein to provide novel couponing and payment transaction functionality.

Figure 4:
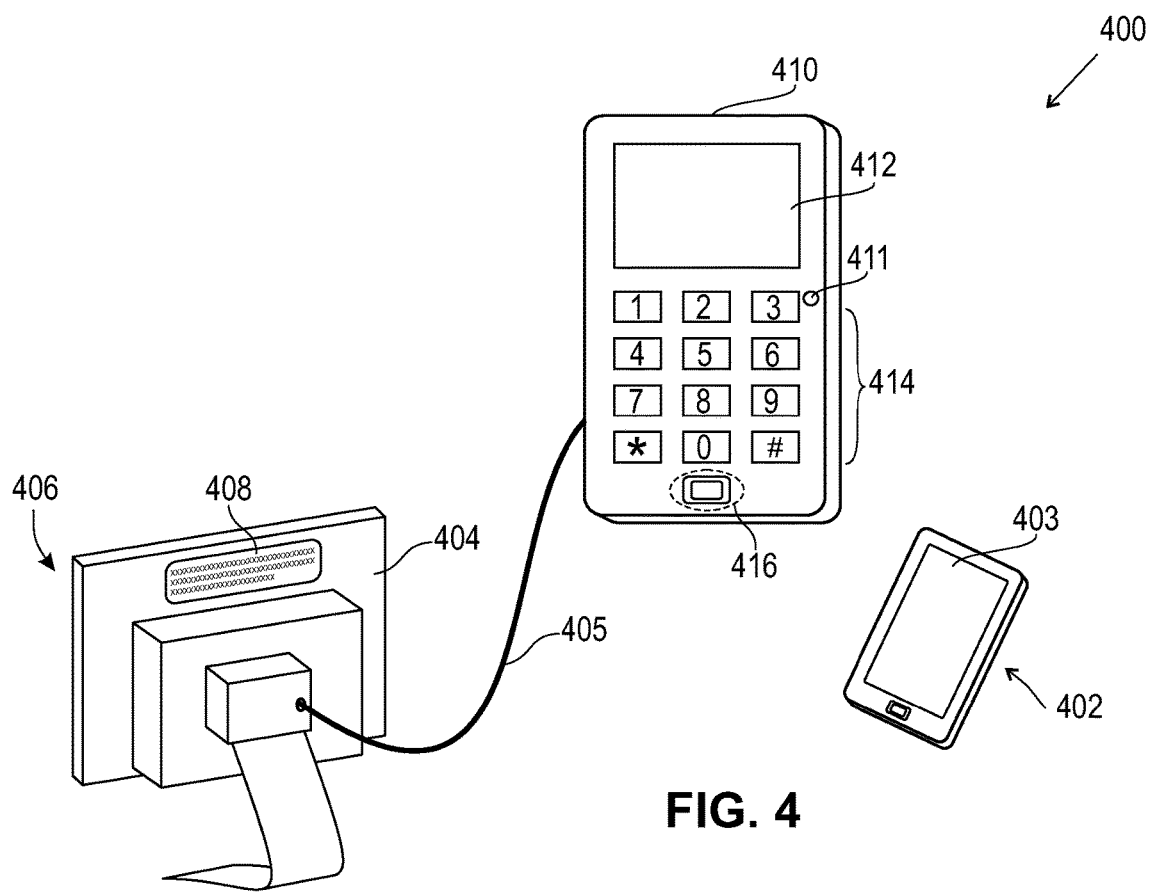
FIG. 4 is a schematic block diagram illustrating an embodiment of a contactless payment device system that may be used in accordance with some embodiments of the invention.

FIG. 4 is a block diagram illustrating an embodiment of a contactless payment device system 400. The contactless payment system 400 includes a POS terminal 404 having a front-facing display screen 406 (placed to face a cashier) and a rear-facing display screen 408 (placed to face a consumer). The POS terminal 404 is connected via a cable 405 to a proximity device reader 410, and may also be connected to other peripheral devices such as a barcode scanner (not shown). The proximity reader 410 includes a consumer-facing display screen 412, keyboard 414, and a "landing zone" 416. To initiate a payment transaction, the consumer is instructed to tap his or her proximity payment device 402 (which may be a Smartphone having a touch screen 403, for example) on the landing zone 416 so that information can be exchanged between the proximity payment device 402 and the proximity reader 410.

During a typical retail store transaction, the consumer brings items to a checkout counter where a cashier scans barcodes on the items that identify the items and that provide the price of each item. A running price subtotal may be displayed as items are scanned, and then a total price for all of the items is typically displayed for the cashier on the display screen 406 and for the customer on the customer-facing display screen 408 of the POS terminal 404. An indicator light 411 on the proximity device reader 410 may be illuminated when it is in the ready state, to indicate that the consumer should tap his payment-enabled mobile telephone (proximity payment device) 402 on the landing zone 416 to initiate a payment transaction. When the consumer taps his proximity payment device 402 on the landing zone, the reader 410 detects that the proximity payment device 402 is present and reads data from the proximity payment device that is required for processing the transaction. Once the data from the proximity payment device has been read (which typically takes only about 0.2 to 0.5 seconds), the proximity reader display 412 may provide visual indicators and a speaker (not shown) may produce a sound cue to indicate to the consumer that he or she can remove the proximity payment device 402 from the landing zone 416. The proximity reader 412 may then indicate that a successful read occurred by using different visual and/or audible cues, which does not mean that the transaction has been authorized, just that the read process has been completed.

In an implementation, the payment transaction data is passed from the proximity reader 410 through the merchant's POS terminal 404 for processing through the payment system network used for existing credit card or debit card-based transactions, except that the data is coded to indicate a proximity payment transaction. In some embodiments, the consumer may be asked to enter a personal identification number (PIN) by using the keyboard 414, which PIN is then submitted as part of the online authorization process. However, in other embodiments, the consumer may be asked to enter a PIN by using the keyboard 112 of his or her mobile telephone 100 (see FIG. 1) or by pressing virtual keys of a digital display keyboard (not shown) on the touch screen 403 of the mobile device 402, which PIN is then validated by the payment application on the mobile phone. Once authorization for the transaction is obtained, the consumer may be notified by an indication on the display 408 of the POS terminal 404 and/or on the display 412 of the proximity reader 410 and/or by an audio queue from the proximity reader. At this time the consumer may be required to sign a receipt (either electronically on a touch screen 412 of the proximity reader, for example, or on a paper receipt by using a pen).

When the proximity payment device 402 is first tapped on the landing zone 416, the proximity device reader 410 initiates the transaction by selecting the proximity payment system environment (PPSE) resident in the payment device and builds a payment candidate list. The PPSE contains a list of generic payment products supported by the proximity payment device, for example, VISA® and MasterCard®. The proximity device reader 410 has a list containing the Application Identifier (AID) of all of the EMV applications that it is configured to support which may be specified by the merchant, for example, which includes products such as MasterCard® and Amex® payment cards, for example. The proximity device reader 410 then generates a candidate list of products that are supported by both the proximity device reader (of the merchant) and the proximity payment device (of the consumer or card account holder). In the above example, the candidate list includes the MasterCard® product as this is the generic payment product that is support by both the proximity reader and proximity payment device. If there are multiple products in the completed candidate list that are a match then the selection of the payment product for use in the transaction is based on the relative priority of each payment product. For example, if the candidate list includes the MasterCard® product with priority 2 and the VISA® product with priority 5, then the MasterCard® product would be selected as it has the higher priority. When the payment product to use has been chosen, the proximity device reader selects the application on the proximity payment device, so that the proximity payment device can supply the correct data records for the transaction.

According to an aspect of the present process, a separate directory called the Proximity Coupon System Environment ("PCSE") is created and is stored in the proximity payment device. The PCSE may be created for coupon applications (such as store coupons, brand coupons, loyalty points, travel pass vouchers and the like), or more generally, for all applications that should be consulted prior to the payment application because these applications provide an alternative means of payment, for example, to obtain access to the requested service or may influence the final transaction amount of the payment. Examples of some applications that provide an alternative means of payment are voucher applications and travel pass applications. Examples of some applications that may influence the final transaction amount include couponing applications and loyalty program applications. Such applications may provide, for example, discounts to be applied to an initial transaction amount (such as ten percent off the total payment amount of items purchased from a particular retailer, or twenty-dollars off an initial transaction amount of a purchase of one hundred dollars or more).

In accordance with an implementation, the proximity device reader 410 selects the Proximity Payment System Environment (PPSE) in the proximity payment device 402 and may detect the presence of the PCSE by an indicator in the file control information ("FCI") of the PPSE. In some embodiments, a particular data element of the FCI indicates the presence of the PCSE, for example, when that data element of the FCI has a value of "1" this indicates the presence of the PCSE, and when that data element of the FCI has a value of "0" it indicates that the PCSE is not present. In some implementations, the coding is extended to cover situations in which there is a need to reselect the coupon application after a payment transaction has occurred. For example, two data elements may be utilized in the FCI to indicate various scenarios, wherein a value of "00" indicates that the PCSE is not present, a value of "10" indicates the presence of the PCSE and no reselection is required, and a value of "11" indicates the presence of the PCSE and that reselection is required. Reselection and reactivation of the coupon application may be required to invalidate coupons after the payment, or may be required to load additional and/or new coupons.

In some embodiments, the product selection process in the proximity device reader is modified based on two parameters: (1) whether the PCSE needs to be consulted prior to the payment application, for example, by labeling the transaction amount as the "initial" transaction amount or labeling it as the "final" transaction amount; and (2) whether the proximity device reader is configured to complete the combined couponing and payment transaction in a single-tap or by using a double-tap process (or other multiple-tap process). Regarding the first parameter, if the transaction amount is labeled as an "initial" transaction amount, then the proximity device reader recognizes that the PCSE and the couponing applications have not yet been consulted and thus the transaction amount may change. Alternately, if the transaction amount is labeled as the "final" transaction amount then the proximity device reader recognizes that the PCSE and the couponing applications have already been consulted (or do not have to be consulted) and thus the transaction amount is fixed and will not change. With regard to the second parameter, if the proximity device reader is configured for a single tap process, and if the couponing application is to be consulted and is present on the proximity payment device, then the couponing information will be retrieved as part of the single tap. As part of the single tap process, the transaction amount may be updated and the payment transaction will be completed with this updated transaction amount.

However, if the proximity device reader is configured for a dual tap (or double tap) process, and if the couponing application is to be consulted and is present on the proximity payment device, then in an implementation the couponing information will be retrieved as part of the first tap while the payment transaction (which is distinct from the couponing transaction) is completed as a separate, second tap. The transaction amount may be updated between the first and second tap. Alternately, in some embodiments wherein the coupon selection occurs after the payment transaction, the coupon selection process could involve utilizing a third tap.

In some embodiments, the payment product selection process in the proximity payment device is modified based on the selection of the couponing application. This is because of the fact that, in some cases, a couponing application is only eligible in combination with a specific payment product, for example, as part of an arrangement between a retailer (such as "Best Buy" stores) and an issuer of a payment product (such as MasterCard®). So when the PPSE is updated to indicate the presence of the PCSE for purposes of a "Best Buy" coupon, it may equally imply that the priority of the MasterCard® product is increased in the PPSE so that MasterCard® becomes the preferred payment application in the PPSE.

Figure 5:
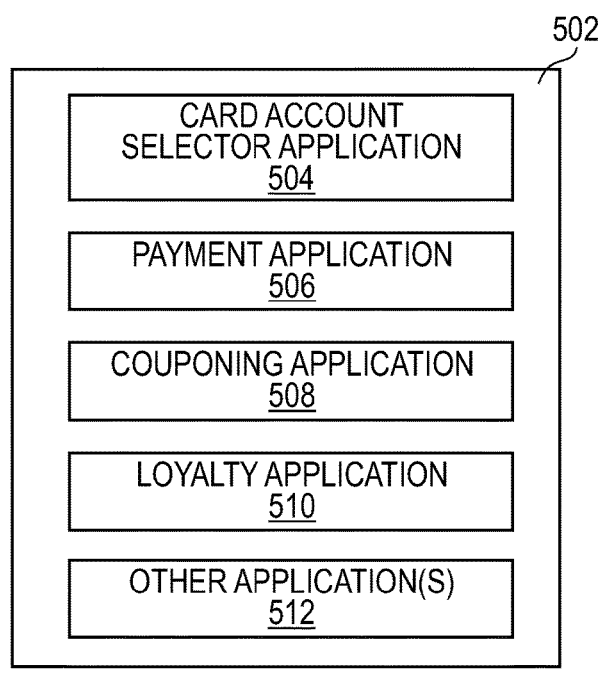
FIG. 5 is a block diagram illustrating certain aspects of software that may include one or more application programs that may be stored in a memory of a proximity payment device for use in accordance with some embodiments of the invention.

FIG. 5 is a block diagram illustrating certain aspects of software (which may include one or more application programs) that may be stored in the memory 304 (see FIG. 3) of a proximity payment device such as the payment-enabled mobile telephone 100 (see FIG. 1) or the proximity payment device 402 (see FIG. 4). In particular, the blocks shown in FIG. 5 represent constituent elements of an electronic wallet function 502 that may be implemented. Thus, block 504 represents a card account selector application program 504 that permits a mobile telephone user (or cardholder) to choose a payment card account and to select criteria and/or conditions for that payment card account that define how to change the priority of that card account for a payment transaction. In some embodiments, the mobile telephone user can utilize his or her payment device (or logon to a website) to select a particular payment card account from a plurality of card accounts and choose one or more conditions that must occur for that payment card account to be accorded a higher priority for a particular transaction.

It is contemplated that a proximity payment device user (such as a cardholder with a payment-enabled mobile telephone) could utilize, for example, a secure website operated by a bank issuer computer to manage his or her payment card accounts, to activate one or more of such payment card accounts on her mobile device, and/or to enable or disable a locking feature. Such a website may be password protected and configured to accept mobile device user input concerning activation and priority criteria and/or conditions, and to download such criteria to the user's mobile device. Such a secure website may provide the payment card account owner with a graphical user interface (GUI) for use in designating payment card accounts for activation by the users' mobile device, wherein the GUI includes menus, sub-menus, text and icons similar to those presented and/or displayed by the mobile device for the same purpose. In such an implementation, the payment card selector application 504 is configured to utilize the data from the website to enable the proximity payment device to automatically activate a card account of the user and to change its priority for a purchase transaction whenever the predefined criteria and/or conditions are satisfied. For example, a particular payment card account may be automatically selected based on the types of goods or services being purchased, such as electronic devices (i.e., flat-panel displays, computers, stereo components, music players, digital cameras and the like), or office supplies, or software, or entertainment (i.e., theater tickets and or movie tickets), or food, or gasoline, or gardening supplies, or to pay utility bills, business expenses or travel expenses, and the like, or some predefined combination thereof. In addition, in some embodiments criteria are combined for any particular designated payment card account. Accordingly, a particular payment card account could be prioritized by the payment-enabled mobile device whenever a payment transaction involving one or more of the preselected criteria occurs.

Referring again to FIG. 5, block 506 represents a payment application program that allows the user to store and manage payment card account information in the mobile telephone 100, and that enables the mobile telephone to function as a contactless transaction device, for example, to enable the mobile phone user to purchase items from a merchant. Therefore, in some embodiments, the payment application program 506 is configured to store a plurality of user payment card account numbers and associated information, and to provide the functionality required for the mobile telephone to transform into a contactless transaction device. Block 508 is a couponing application program that allows a user to select, store and manage coupons that may be utilized, for example, to lower the price of one or more items during a purchase transaction and that include identification data associated with retailers and/or service providers and/or products and/or services. For example, the mobile device user could designate a credit card account for use in combination with coupon applications from "brick and mortar" retailers such as "Whole Foods™", "Best Buy™", "Lord & Taylor™", and/or "Macys™", and/or the mobile device may be configured to automatically select a payment card account based on a selected coupon or based on some other predefined criteria which may be managed by the couponing application 508. The couponing application 508 in the mobile device may therefore be configured to prioritize a particular payment card account based on receipt of an on-line merchant identifier or the like.

Block 510 is a loyalty application program that allows the user to store and manage customer loyalty and/or rewards card accounts that may include identification credentials (e.g., identification and/or loyalty account numbers) associated with retailers and/or service providers. Thus, the loyalty application program 510 may allow the mobile telephone 100 to also function as a contactless identification token by, for example, transmitting the loyalty program identification numbers to proximity readers present in retail stores.

Block 512 represents certain other types of software applications that may be stored in the memory 304 (FIG. 3) that control and/or provide functionality associated with the payment circuit 224. For example, in some embodiments a transit access application program may be provided that allows the mobile telephone 100 to store the user's mass transit account number(s) so that the user's mobile telephone can function as a contactless access card for providing payment and/or access to a mass transit system (for example, permitting the user to ride on a city bus and/or to obtain a ride on a subway train). It should be understood that an electronic wallet function 502 may, in some embodiments, lack one or more of the application programs described herein, and/or include additional functions not described herein.

Figure 6:
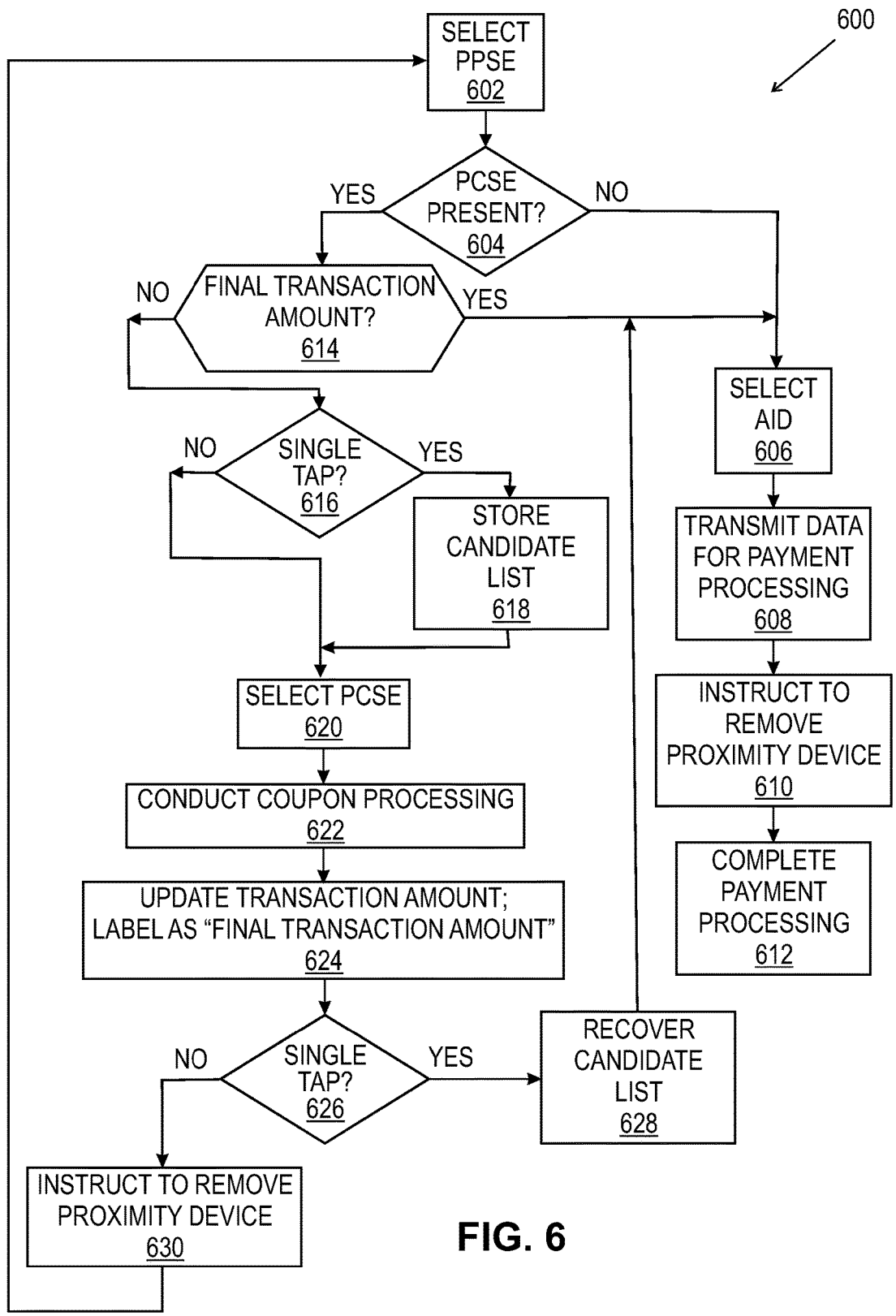
FIG. 6 is a flow chart illustrating a couponing process that may be performed by utilizing a contactless payment device in accordance with some embodiments of the invention.

FIG. 6 is a flow chart 600 illustrating a couponing process performed by utilizing a proximity payment device in accordance with novel aspects disclosed herein. In particular, the process 600 is from the perspective of a proximity device reader, and begins when the consumer taps his or her proximity payment device on the landing zone of the proximity device reader. The proximity device reader then selects 602 the PPSE to build a payment candidate list (as described above) of payment products for potentially use in the payment transaction. If the PPSE indicates 604 that no PCSE is present (for example, a value in the FCI is "0"), then no coupon processing takes place, and the proximity payment reader selects 606 an application identifier (AID) associated with a payment card account to utilize, transmits 608 data for conventional payment processing, and then instructs 610 the cardholder to remove the proximity payment card (for example, by displaying a message on the display screen 412). The proximity payment reader then completes 612 the payment process. It should be noted that, in some situations a purchase transaction may be completed offline, that is, at the point of sale device, whereas under other circumstances the data transmitted at step 608 is transmitted online to an issuer in an authorization request and then completed after the authorization is received.

However, if in step 604 the proximity device reader determines that the PCSE is present, then the proximity device reader determines 614 whether the PCSE should be consulted or not, for example, based on whether the transaction amount is designated as a final transaction amount or an initial transaction amount. If it is designated as a final transaction amount (because, for example, the proximity reader is configured for a dual tap process, which is explained below), then again no coupon processing occurs, the proximity payment reader selects 606 an application identifier (AID) associated with a payment card account to utilize, transmits 608 data for conventional payment processing, and then instructs 610 the cardholder to remove the proximity payment card. The proximity payment reader then completes 612 the payment process as noted above.

But, if in step 614 it is determined that the transaction amount is an initial transaction amount (not a final transaction amount), and the proximity device reader is configured for a single tap process 616, then a candidate list is stored 618 before selecting 620 the PCSE (which avoids the occurrence of an additional select PPSE process after the couponing process). But if the proximity device is configured for a dual tap (or more) process 616, then the PCSE is selected 620, a candidate list is built and couponing is initiated. Next, coupon processing 622 occurs, which may entail, for example, subtracting the value of one or more coupons from the initial transaction price to arrive at a final transaction price, and/or applying loyalty points to an account of the cardholder, and/or applying a voucher to the initial transaction price to arrive at a final transaction price, and/or transmitting identification data to a service provider, and the like. Upon completion of coupon processing, the transaction amount is updated 624 and is labeled as a final transaction amount. Next, if the proximity device reader is configured for a single tap process 626, then the candidate list (saved in step 618) is recovered 628, the proximity payment reader selects 606 an application identifier (AID) associated with a payment card account to utilize, transmits 608 data for conventional payment processing, and then instructs 610 the cardholder to remove the proximity payment card. The proximity payment reader then completes 612 the payment process.

However, if in step 626 the proximity device reader is configured for dual tap processing, then the cardholder is instructed 630 to remove his or her proximity payment device as initiation for the second tap. The cardholder may then be prompted to perform the "dual tap" by tapping his or her proximity payment device on the landing zone of the card reader, which causes the process to loop back to step 602. It is noted that, when step 614 is encountered, the transaction amount will be labeled as the "final transaction amount", which will cause the process to branch to step 606 for conducting payment processing. It should also be noted that in the case of a dual tap process, the priorities in the FCI of the PPSE may have been re-ordered and that the payment AIDs may have been added or removed. Accordingly, a different payment product could be used for the payment transaction.

In some embodiments, the process may include a processor of a payment-enabled mobile device storing a Proximity Coupon System Environment (PCSE) that includes coupon applications for providing an alternative form of payment and/or that can influence a final transaction amount. A list of the coupon applications may be stored in the File Control Information (FCI) file of the PCSE, and an indication of the existence of the PCSE may be stored in the FCI file of a Proximity Payment System Environment (PPSE). When a payment transaction request is received from a proximity reader, the payment-enabled mobile device transmits the indication of the existence of the PCSE along with a list of coupon applications to consider before determining the final transaction amount for a payment transaction. In some implementations, the FCI file of the PPSE includes an indication that the coupon transaction is to be performed via a single tap in combination with the payment transaction, or that it is to be performed separately from the payment transaction via a dual tap.

In some implementations, the payment-enabled mobile device modifies the coupon applications included in the FCI file of the PCSE based on retail store data and/or data concerning the coupon applications supported by that retail store. The mobile device then prioritizes the payment applications included in the FCI file of the PPSE stored in the storage device, based on a dependency between at least one coupon application and at least one payment application. For example, the customer may be in a Best Buy retail store and his or her mobile device may include a stored Best Buy coupon. In addition, the coupon may require the use of a particular payment product, such as a MasterCard™ credit card, for conducting the payment transaction in order to obtain a discount in the price of an item or items. In this case, the mobile device prioritizes the payment application for the MasterCard™ payment product ahead of similar payment products that are not eligible for the discount. The process may also include transmitting, when the mobile device is interrogated by a radio frequency device reader, the FCI file of the PPSE which includes a list of payment applications and an indication that the PCSE exists. The mobile device also transmits, when interrogated by the radio frequency device reader, the FCI file of the PCSE including a list of relevant coupon applications, and information comprising payment products, coupon products based on the list of relevant coupon applications, and an indication that payment and couponing are to be conducted by the customer presenting the mobile device in a single tap or in a double tap.

In some embodiments, the payment-enabled mobile device obtains information identifying at least one of a retail store and coupon applications supported by that retail store. Such information may be obtained, for example, by the payment-enabled mobile device communicating with a proximity reader of the retail store by utilizing a near-field communication (NFC) protocol or an RFID communication protocol. Alternately, the consumer may browse a website with his or her mobile device and then store the identifying information into a storage device of the payment-enabled mobile device, or otherwise browse a website and transmit the identifying data to the payment-enabled mobile device. In some embodiments, the payment-enabled mobile device stores the identifying information, reads data transmitted from a proximity reader that identifies a retail store and determines that coupon data associated with the identified retail store exists. The payment-enabled mobile device may then update the FCI file of the PCSE to list relevant coupon applications associated with the identified retail store, and update the FCI file of the PPSE to indicate that the PCSE is present and that relevant coupon applications are available to utilize during a payment transaction associated with the retail store. In some implementations, the payment-enabled mobile device updates the FCI file of the PPSE based on data associated with the relevant coupon applications. In addition, such updating may include prioritizing payment products stored in the storage device based on data associated with the relevant coupon applications and/or criteria encoded in the payment-enabled mobile device. In another embodiment, the updating may include prioritizing the relevant coupon applications based on data associated with at least one payment product stored in the storage device. Moreover, updating of the FCI file may include a consumer browsing a website and then conducting prioritization of the payment products based on data obtained from the website.

Embodiments as described and depicted herein may be particularly advantageous to provide an easy to use payment-enabled mobile device that includes both automatic payment card account functionality and automatic couponing selection functionality.

In some embodiments, a payment-enabled mobile telephone phone may have voice recognition capabilities, and those capabilities may tie in to the automatic card selection application and to the couponing application. For example, the user may be permitted to provide criteria for selecting a particular credit card account (and selected criteria) and for enabling couponing by speaking into the microphone of the mobile phone. For example, the user may speak the words "Auto-Selection" and then "MasterCard debit" and then "Enable coupons" into a microphone of the mobile telephone. In some embodiments such actions would cause the mobile telephone display screen to present automatic selection criteria that the user can choose to define when the user's MasterCard debit card will be automatically selected along with one or more coupons in future contactless purchase transactions in accordance with the processes described herein.

As the term "payment transaction" is used herein and in the appended claims, it should be understood to include the types of transactions commonly referred to as "purchase transactions" in connection with payment card systems.

As used herein and in the appended claims, the term "initiating a transaction" includes a proximity payment device such as a payment-enabled mobile telephone communicating with reader device that may be associated with a POS terminal. The term "initiating a transaction" can also include a payment-enabled mobile device communicating with a website to transmit and receive data so as to enter into on-line payment transactions.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for performing a payment transaction, comprising:
   reading, by a proximity reader in a retail store, a proximity payment system environment (PPSE) of a proximity payment device of a consumer;
   determining, by the proximity reader, that a proximity coupon system environment (PCSE) is present in the proximity payment device and that the PCSE should be consulted because a transaction amount is an initial transaction amount;
   reading, by the proximity reader, the PCSE and selecting a coupon application based on a coupon application priority specified by the proximity payment device;
   processing, by the proximity reader, coupon information with an initial transaction amount to determine a final transaction amount;
   providing an indication, by the proximity reader to the consumer, to remove the proximity payment device;
   providing an indication, by the proximity reader to the consumer, to again present the proximity payment device;
   reading, by the proximity reader, the PPSE of the proximity payment device;
   building, by the proximity reader, a candidate list of payment products;
   selecting, by the proximity reader, a payment product from the candidate list based on a relative priority associated with each payment product and the selected coupon application; and
   transmitting, by the proximity reader, payment product information of the selected payment product and the final transaction amount to a point of sale (POS) device for payment processing.

2. The method of claim 1, further comprising:
   providing an indication, by the proximity reader to the consumer, to again present the proximity payment device; and
   transmitting, to the proximity payment device, at least one of coupon information, voucher data, loyalty data, and travel data.

3. The method of claim 1, wherein the candidate list of payment products comprises data identifying payment products supported by both the proximity reader and the proximity payment device.

4. The method of claim 1, wherein at least one of the selected coupon application and the selected payment product depends on an identity of a merchant.

5. A contactless payment device system comprising:
   a point of sale (POS) terminal;
   a proximity device reader operably coupled to the POS terminal; and
   a payment-enabled mobile device;
   wherein the proximity device reader comprises a display, a keyboard, a landing site and a memory, and wherein the memory comprises instructions configured to cause the proximity device reader to:
     read a proximity payment system environment (PPSE) of a proximity payment device of a consumer;
     determine that a proximity coupon system environment (PCSE) is present in the proximity payment device and that the PCSE should be consulted because a transaction amount is an initial transaction amount;
     read the PCSE and select a coupon application based on a coupon application priority specified by the proximity payment device;
     process coupon information with an initial transaction amount to determine a final transaction amount;
     provide an indication to the consumer to remove the proximity payment device;
     providing an indication to the consumer to again present the proximity payment device;
     read the PPSE of the proximity payment device;
     build a candidate list of payment products;
     select a payment product from the candidate list based on a relative priority associated with each payment product and the selected coupon application; and
   transmit payment product information of the selected payment product and the final transaction amount to a point of sale (POS) device for payment processing.

* * * * *